(12) United States Patent
Johnson et al.

(10) Patent No.: US 7,481,659 B2
(45) Date of Patent: Jan. 27, 2009

(54) MULTICONNECTOR MEMORY CARD

(75) Inventors: Gregory H. Johnson, Oakdale, MN (US); Daniel C. Egan, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 11/650,313

(22) Filed: Jan. 5, 2007

(65) Prior Publication Data
US 2008/0166920 A1    Jul. 10, 2008

(51) Int. Cl.
H01R 13/44    (2006.01)

(52) U.S. Cl. ........................ 439/131; 361/737

(58) Field of Classification Search ................. 439/131, 439/170, 171, 172; 361/737; 235/492
See application file for complete search history.

(56) References Cited

U.S. PATENT DOCUMENTS

| | | | |
|---|---|---|---|
| 4,647,123 | A | 3/1987 | Chin et al. |
| 4,885,482 | A | 12/1989 | Sharp et al. |
| 4,980,856 | A | 12/1990 | Ueno |
| 5,463,261 | A | 10/1995 | Skarda et al. |
| 5,537,584 | A | 7/1996 | Miyai et al. |
| 5,541,909 | A | 7/1996 | Nakajima et al. |
| 5,748,912 | A | 5/1998 | Lee |
| 6,006,295 | A | 12/1999 | Jones et al. |
| 6,040,066 | A | 3/2000 | Zhou et al. |
| 6,111,757 | A | 8/2000 | Dell et al. |
| 6,116,927 | A | 9/2000 | Johnson et al. |
| 6,148,354 | A | 11/2000 | Ban et al. |
| 6,175,517 | B1 | 1/2001 | Jigour et al. |
| 6,292,863 | B1 | 9/2001 | Terasaki et al. |
| 6,295,031 | B1 | 9/2001 | Wallace et al. |
| 6,381,143 | B1 | 4/2002 | Nakamura |
| 6,385,677 | B1 | 5/2002 | Yao |
| 6,407,940 | B1 | 6/2002 | Aizawa |
| 6,438,638 | B1 | 8/2002 | Jones et al. |
| 6,490,667 | B1 | 12/2002 | Ikeda |
| 6,501,163 | B1 | 12/2002 | Utsumi |
| 6,567,273 | B1 | 5/2003 | Liu et al. |
| 6,616,053 | B2 | 9/2003 | Kondo et al. |
| 6,618,789 | B1 | 9/2003 | Okaue et al. |
| 6,654,841 | B2 | 11/2003 | Lin |
| 6,676,420 | B1 | 1/2004 | Liu et al. |

(Continued)

FOREIGN PATENT DOCUMENTS

CN        1304115        7/2001

(Continued)

OTHER PUBLICATIONS

"Flashpoint Memory Stick," http://www.hometoys.com, 1 page, printed Nov. 24, 2004.

(Continued)

*Primary Examiner*—Thanh-Tam T Le
(74) *Attorney, Agent, or Firm*—Eric D. Levinson

(57) ABSTRACT

The invention is directed to a memory card including a first connector that conforms to a first connection standard and a second connector that conforms to a second connection standard. The connectors are provided on a movable member disposed within a housing of the memory card. The movable member may be moved between a first position, in which the first connector is exposed, and a second position, in which the second connector is exposed.

22 Claims, 11 Drawing Sheets

U.S. PATENT DOCUMENTS

| | | | |
|---|---|---|---|
| 6,732,218 | B2 | 5/2004 | Overtoom et al. |
| 6,738,259 | B2 | 5/2004 | Le et al. |
| 6,795,327 | B2 | 9/2004 | Deng et al. |
| 6,814,596 | B2 * | 11/2004 | Yu et al. ............... 439/159 |
| 6,817,533 | B2 * | 11/2004 | Chen ..................... 235/492 |
| 6,829,726 | B1 | 12/2004 | Korhonen |
| 6,833,792 | B1 | 12/2004 | Smith et al. |
| 6,846,192 | B2 * | 1/2005 | Tien ..................... 439/159 |
| 6,883,718 | B1 | 4/2005 | Le et al. |
| 6,890,188 | B1 * | 5/2005 | Le ..................... 439/76.1 |
| 6,908,038 | B1 * | 6/2005 | Le ..................... 235/492 |
| 7,068,517 | B2 | 6/2006 | Yen |
| 7,151,673 | B2 | 12/2006 | Le et al. |
| 2002/0038405 | A1 | 3/2002 | Leddige et al. |
| 2002/0038432 | A1 | 3/2002 | Hsu |
| 2002/0147882 | A1 | 10/2002 | Pua et al. |
| 2002/0166009 | A1 | 11/2002 | Lin |
| 2002/0171999 | A1 | 11/2002 | Huang |
| 2002/0195500 | A1 | 12/2002 | Maruyama |
| 2003/0095386 | A1 | 5/2003 | Le et al. |
| 2003/0221066 | A1 | 11/2003 | Kaneko |
| 2004/0003262 | A1 | 1/2004 | England et al. |
| 2004/0033727 | A1 | 2/2004 | Kao |
| 2004/0122911 | A1 | 6/2004 | Chong, Jr. et al. |
| 2004/0148450 | A1 | 7/2004 | Chen et al. |
| 2004/0172527 | A1 | 9/2004 | Ono et al. |
| 2004/0199911 | A1 | 10/2004 | Lo et al. |
| 2004/0252560 | A1 | 12/2004 | Hsieh |
| 2005/0005076 | A1 | 1/2005 | Lasser |
| 2005/0037647 | A1 | 2/2005 | Le |
| 2005/0068016 | A1 | 3/2005 | Hung |
| 2005/0086413 | A1 | 4/2005 | Lee et al. |
| 2005/0120157 | A1 | 6/2005 | Chen et al. |
| 2005/0122648 | A1 | 6/2005 | Wu et al. |
| 2005/0129385 | A1 | 6/2005 | Speasl et al. |
| 2005/0235091 | A1 | 10/2005 | Chen et al. |
| 2005/0278461 | A1 | 12/2005 | Ohta |
| 2006/0047880 | A1 | 3/2006 | Lindblom et al. |

FOREIGN PATENT DOCUMENTS

| | | |
|---|---|---|
| EP | 132824 A2 | 9/2001 |
| EP | 1197826 B1 | 4/2002 |
| EP | 1333531 A1 | 8/2003 |
| JP | 2002-084930 | 3/2002 |
| WO | WO 0161692 | 8/2001 |
| WO | WO 0219266 A2 | 3/2002 |

OTHER PUBLICATIONS

"Xmultiple," http://www.starbursthomepage.com/xflashpointx.htm, 4 pages, printed Dec. 3, 2004.

"FlashPoint," www.xmultiple.com, 1 page.

www.flashpoint.com—"Specifications and Data Transfer Information—The Thumbdrive with Intelligence" (Publication date Unknown) (Printed Jul. 27, 2005).

www.flashpoint.com—"Patent Pending—FlashPoint ShareDrive Device—Filed 2004" (Publication date Unknown) (Printed Jul. 27, 2005).

www.flashpoint.com—"Meet A Business Contact Or a Friend and Transfer Data, Photo's & MP3's—What are FlashPing ShareDrives" (Publication date Unknown) (Printed Jul. 27, 2005).

http://blogs.pcworld.com/staffblog/archives/000300.html *Today @ PC World* "Move Files Between USB Flash Drives", Sans PC (Nov. 8, 2004).

http://www.gizmag.com/go/4135 "USB ShareDrive: the thumbdrive with a brain" (Jun. 8, 2005).

http://www.sandisk.com/Products/Catalog(1096)-SanDisk_Ultra_II_SD_Plus_Cards.aspx "SanDisk Ultra® II SD™ Plus Cards" (Jan. 4, 2007).

* cited by examiner

MULTICONNECTOR MEMORY CARD

TECHNICAL FIELD

The invention relates to removable storage media devices and, in particular, removable memory cards.

BACKGROUND

A wide variety of removable storage media exist for use with voice recorders, digital video camcorders, digital cameras, personal digital assistants (PDAs), cellular phones, video games, digital televisions, photo printers, and the like. The removable storage media allow users to capture and store data on such devices, and easily transport the data between these devices and host computers.

One of the most popular types of removable storage media is the flash memory card, which is compact, easy to use, and has no moving parts. A flash memory card includes an internal, high-speed solid-state memory capable of persistently storing data without application of power. Numerous other types of memory can also be used in memory cards, including electrically-erasable-programmable-read-only-memory (EEPROM), non-volatile random-access-memory (NVRAM), and other non-volatile or volatile memory types, such as synchronous dynamic random-access-memory (SDRAM), with battery backup.

A wide variety of memory cards have been recently introduced, each having different capacities, access speeds, formats, interfaces, and connectors. Examples of memory cards include CompactFlash (CF) first introduced by SanDisk Corporation, the Memory Stick (MS) and subsequent versions including Memory Stick Pro and Memory Stick Duo developed by Sony Corporation, Smart Media memory cards, Secure Digital (SD) memory cards, and MultiMedia Cards (MMCs) jointly developed by SanDisk Corporation and Siemens AG/Infineon Technologies AQ and xD digital memory cards developed by Fuji. Many other memory card standards continue to emerge and evolve.

Each of the different memory cards typically has a unique connector, which defines the electrical and mechanical interfaces of the card. Moreover, each different memory card generally requires a specialized adapter or reader for use with a host computer. The adapter or reader includes a specialized interface that conforms to that of the memory card and an interface that is configured to be accepted by a host computer. For example, an adaptor or reader may include a device interface to receive a memory card and a host computer interface to connect to a host computer, such as a personal computer memory card international association (PCMCIA) standard including a 16 bit standard PC Card standard and a 32 bit CardBus standard, a Universal Serial Bus (USB) standard, a Universal Serial Bus 2 (USB2) standard, an IEEE 1394 FireWire standard, a Small Computer System Standard (SCSI) standard, an Advance Technology Attachment (ATA) standard, a serial ATA standard, a Peripheral Component Interconnect (PCI) standard, a PCI Express standard, a conventional serial or parallel standard, or the like.

Conventional memory cards have only one connector to interface with a device. The same connector also interfaces with the adaptor or reader to allow the memory card to be read by a host computer. Most conventional adapters and readers support only a single type of memory card, and accordingly, a user may carry and interchange adapters or readers when using different types of memory cards.

SUMMARY

The invention is directed toward a memory card including a first connector that conforms to a first connection standard and a second connector that conforms to a second connection standard. For example, in one embodiment, the memory card comprises a device connector that conforms to a device connection standard, such as a Memory Stick standard, and a host connector that conforms to a host connection standard, such as a Universal Serial Bus (USB) standard.

The connectors are provided on a movable member that is movably mounted within a housing of the memory card. In one embodiment, the connectors are disposed on opposite ends of the movable member, which also includes a memory module electrically coupled to the connectors. The movable member may be moved relative to the housing of the memory card to a first position to expose the first connector or moved to a second position to expose the second connector. When the movable member is in the first position, the second connector is substantially retracted into the housing such that the dimensions of the memory card substantially conform to a memory card standard. In one embodiment, when the second connector is substantially retracted into openings defined by the housing such that at least a portion of the second connector is exposed, but the second connector does not extend past the outer perimeter of the housing. When the movable member is in the second position, the second connector extends from the housing and at least a portion of the first connector is covered, which helps protect the electrical contacts of the first connector from damage, electrostatics, debris, and so forth during use of the second connector. In this way, the multiple interface (i.e., multiconnector) memory card described herein may eliminate the need for a cap or flap to cover the first and/or second connectors when the respective connector is not in use.

The memory card may include a locking mechanism to secure the movable member in the first and second positions. For example, the movable member and housing may include interlocking components to secure the movable member in the first and second positions, where the interlocking components may be released in order to move the movable member between the first and second positions.

The dimensions of the memory card may substantially conform to dimensions and a form factor of a memory card standard. In some embodiments in which the memory card comprises a device connector and a host connector, the memory card may connect directly to the host connector without an adaptor or reader.

In one embodiment, the invention provides a memory card comprising a housing, a memory, and a movable member movably mounted to the housing. The movable member comprises a first connector electrically coupled to the memory and substantially conforming to a first connection standard, and a second connector electrically coupled to the memory and substantially conforming to a second connection standard.

In another embodiment, the invention provides a system comprising a first device including a first electrical contact for receiving a first connector that conforms to a first connection standard, a second device including a second electrical contact for receiving a second connector that conforms to a second connection standard, and a memory card. The memory card comprises a housing, and a movable member movably mounted within the housing. The movable member comprises a memory, the first connector electrically coupled to the memory and conforming to the first connection standard, and the second connector electrically coupled to the memory and conforming to the second connection standard. When the movable member is in a first position relative to the housing, the first connector is exposed, and when the movable member is in a second position relative to the housing, the second connector is exposed.

In yet another embodiment, the invention provides a method comprising moving a movable member of a memory card to an extended position to cover a first connector substantially conforming to a first connection standard and expose a second connector substantially conforming to a second connection standard. The memory card further comprises a housing, the movable member being movably mounted to the housing, and a memory electrically coupled the first connector and the second connector. The method further comprises electrically connecting the memory of the memory card to a device via the second connector.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
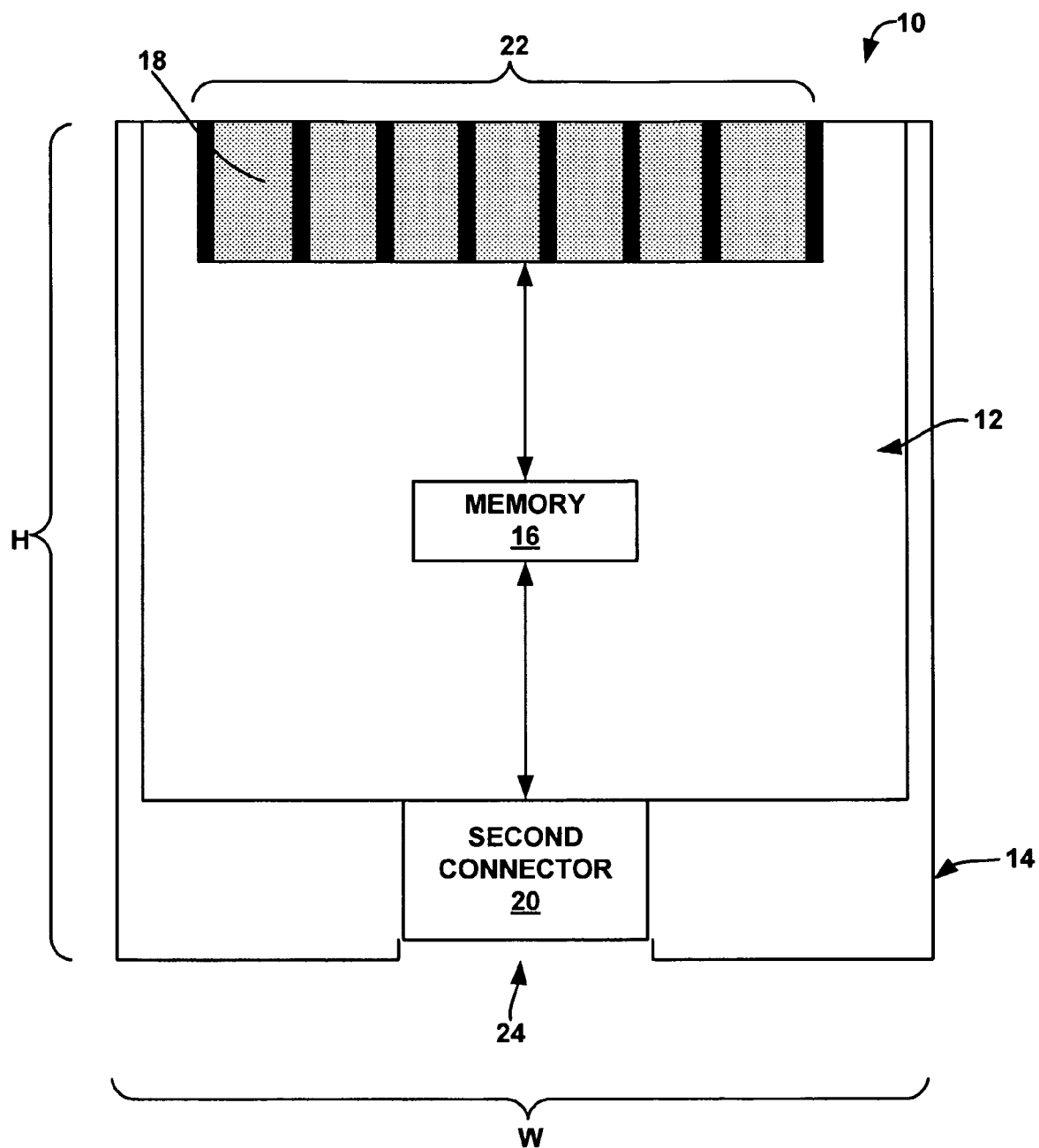
FIG. 1A is a schematic block diagram of a memory card including a movable member in a first position relative to a housing.
Figure 1B:
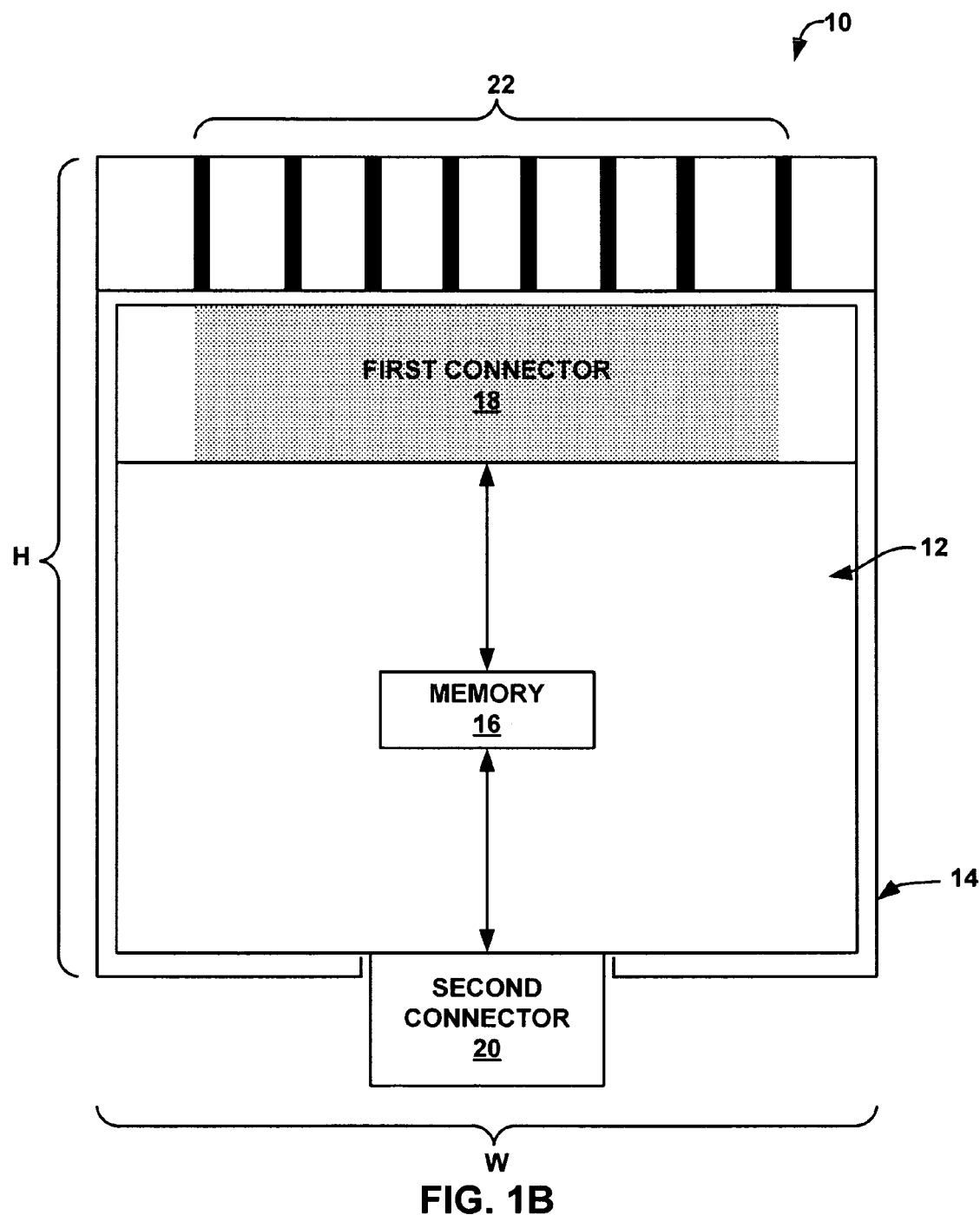
FIG. 1B is a schematic block diagram of the memory card of FIG. 1A and illustrates the movable member in a second position relative to the housing.

The invention is directed to a memory card including at least two connectors that conform to different connection standards. The connectors are disposed on a movable member within a housing of the memory card. The movable member is movable between two positions relative to the housing. In a first position, the first connector is exposed from the housing and in a second position, the second connector is exposed from the housing. In the first position, when the first connector is exposed, the second connector may be non-exposed and protected within the housing. Similarly, in the second position, when the second connector is exposed, the first connector may be non-exposed and protected within the housing FIGS. 1A and 1B are schematic block diagrams of a memory card 10, which includes movable member 12 movably mounted within housing 14. Movable member 12 may comprise a circuit board or the like that supports one or more memory modules 16 ("memory 16"), first connector 18, second connector 20, and one or more controllers for memory 16, first connector 18, and second connector 20. First connector 18 and second connector are each electrically coupled to memory 16 and are located on opposite ends of movable member 12, and may include electrical contacts disposed on the same surface of movable member 12 or on different surfaces of movable member 12. While a one piece movable member 12 is shown in FIGS. 1A and 1B, in other embodiments, movable member 12 may be comprised of two or more pieces that are mechanically coupled together such that first and second connectors 18, 20 are mechanically coupled together and movement of one connector 18 or 20 results in a corresponding movement of the other connector 18 or 20.

FIG. 1A illustrates a first position of movable member 12 relative to housing 14 and FIG. B illustrates a second position of movable member 12. Movable member 12 may be spring loaded within housing 14 to encourage movement of movable member 12 between the first and second positions. In one embodiment, first connector 18 conforms to a device connection standard and second connector 20 conforms to a host connection standard. For example, first connector 18 may conform to a Memory Stick standard, and second connector 20 may conform to a Universal Serial Bus (USB) standard. In embodiments in which first connector 18 conforms to a device connection standard and second connector 20 conforms to a host connection standard, the need for an adapter or reader to couple memory card 10 to a host computer may be eliminated because memory card 10 may be directly coupled to the host computer via second connector 20.

First connector 18 is configured to couple to a device contact conforming to the same device connection standard and operates in a similar manner to a conventional memory card. Examples of suitable devices include a voice recorder, digital video camcorder, digital camera, personal digital assistant (PDA), cellular phone, video game console, digital television, photo printer or the like. Second connector 20 is configured to couple directly to a host computer port conforming to the same host connection standard and facilitates direct electrical coupling of memory 16 to a host computer. In this way, memory card adapter functionality may be incorporated in any memory card format, eliminating the need for a separate adapter or card reader. Instead, the memory card described herein may itself be connected directly to a host computer without any adaptor or card reader. A host computer may be a personal computer, laptop computer, workstation, or any computer that includes a host interface. Of course, a user could still utilize an adaptor or reader to read or write information to and from memory 16 (i.e., second connector 20 may be connected to an adaptor or reader, which connects memory 16 to the host computer).

Second connector 20 may be a shieldless USB tab, which is a Uniform Serial Bus (USB) tab without a conventional electrical shield. A shield may be present in a conventional tab to improve a physical wire connection and signal transmission. However, the USB tab may directly connect to a USB port of a device in the embodiments of the invention. Therefore, the need for a wire, and a shield for the wire, may be eliminated without substantially affecting the connection between the USB tab and the USB port. In addition, a shieldless USB tab is typically thinner than a conventional USB interface that includes the shield. Accordingly, in embodiments in which second connector 20 is a USB tab, elimination of the shield may help ensure that second connector 20 does not add thickness to memory card 10 that would hinder insertion of memory card 10 into a device. In accordance with the invention, other standards may similarly be supported via a shieldless tab, i.e., non-USB standards in which a shield is conventionally included on the connector used but could be eliminated on a memory card.

In other embodiments, first and second connectors 18, 20 may both be configured to substantially conform to the same or different device connection standards. In such embodiments, memory card 10 may replace the need for two or more separate conventional memory cards by integrating two or more device connection standards into one memory card. Thus, in that case memory 16 may store information from different devices that conform to different device connection standards. For example, memory 16 may store pictures from a digital camera along with appointments from a PDA, even if the two device contacts do not conform to the same device connection standard. In this way, memory card 10 may eliminate the need for separate memory cards to couple to device contacts conforming to different DCC standards.

In yet other embodiments, first and second connectors 18, 20 may both be configured to substantially conform to the same or different host connection standards. In that case, each connector 18, 20 is configured to directly couple to a computing device conforming to the host connection standard associated with the respective connector 18 or 20. Accordingly, in that case, memory card 10 may operate as a removable storage device that can couple to the host computer through more than one port. For example, if first connector 18 conforms to a USB standard and second connector 20 conforms to a FireWire standard, memory card 10 may couple to the host computer via a USB port or a FireWire port depending on which port the host computer is equipped with or which port is more accessible.

In other embodiments, memory card 10 may include additional connectors that each conform to either a device connection standard or a host connection standard. Memory card 10 may couple to several device contacts conforming to different device connection standards and several computing device ports conforming to different host connection standards. In that case, memory card 10 may operate as a memory card, an external storage device, and an adapter or reader all integrated into one card. In order to accommodate the additional connectors, movable member 12 may be configured to move in more than one direction to expose the additional connectors. That is, rather than moving along one axis, as shown in the embodiments of FIGS. 1A and 1B, in other embodiments, movable member 12 may be configured to move along two or more axes.

First connector 18 and second connector 20 are electrically coupled to memory 16. Memory 16 may comprise flash memory, electrically-erasable-programmable-read-only-memory (EEPROM), non-volatile random-access-memory (NVRAM), and other nonvolatile or volatile memory types, such as synchronous dynamic random-access-memory (SDRAM), or the like.

Housing 14 defines slots 22 for exposing first connector 18 and defining electrical contacts that are configured to electrical couple with a device. Together with slots 22, first connector 18 defines the mechanical and electrical connections for electrically coupling memory 16 with a device. When movable member 12 is in a first position, as shown in FIG. 1A, first connector 18 is exposed through slots 22, and at least a portion of second connector 20 is disposed within housing 14 in order to protect second connector 20 from damage, electrostatics, or debris, during use of first connector 18. The first position of movable member 12 may also be referred to as a "retracted position" because second connector 20 is substantially retracted into housing 14 when movable member 12 is in the first position. While second connector 20 may still be exposed through openings defined by housing 14 in some embodiments, second connector 20 may still be considered to be at least partially retracted into housing 14.

When movable member 12 is in its first position, the dimensions of memory card 10 may substantially conform to a form factor of a memory card form factor standard. In the embodiment shown in FIGS. 1A-1B, second connector 20 does not extend past the outer perimeter of housing 14 when movable member 12 is in its first position, which allows the dimensions of memory card 10 to conform to a memory card form factor. Of course, in other embodiments, second connector 20 may extend past the outer perimeter of housing 14 when movable member 12 is in its first position, while still permitting memory card 10 to conform to a memory card form factor. Conformity to a memory card form factor standard may permit memory card 10 to be introduced into devices as well as allow memory card 10 to be compatible with memory card accessories, such as storage cases or other accessories that are affected by the form factor of the memory card. For example, some memory card standards, such as a Secure Digital (SD) standard, set a standard length L, width W, and thickness of memory card 10 that is typically required for memory card 10 to fit within a device supporting the particular memory card standard. Some memory card standards, however, only set standards for certain dimensions of memory card 10, such as only the width W and thickness. In embodiments in which first connector 18 conforms to a device standard, memory card 10 may be introduced into the device when movable member 12 is in the first position without the aid an external apparatus (e.g., a cap) to bring the dimensions of memory card 10 into conformity with a memory card standard.

In one embodiment, when movable member 12 is in the first position, height H of memory card 10 may be about 31 millimeters (mm) or about 50 mm, width W of memory card 10 may be about 20 mm or about 21.5 mm, and a thickness T (not shown in FIG. 1A or 1B), which is measured in a direction that is substantially perpendicular to the height H and width W (i.e., into the plane of the image of FIGS. 1A and 1B), of about 1.6 mm or about 2.8 mm. The Memory Stick and Memory Stick PRO standards define a height of about 50 mm, a width of about 21.5 mm, and a thickness of about 2.8 mm. The Memory Stick Duo and Memory Stick PRO Duo standards define a height of about 31 mm, a width of about 20 mm, and a thickness of about 1.6 mm. In accordance with the invention, memory card 10 can substantially conform to these dimensions, yet include first connector 18 as well as second connector 20.

Housing 14 also defines an opening 24 configured to receive second connector 20 such that when movable member 12 is in a second position, as shown in FIG. 1B, second connector 20 protrudes through opening 24 and past the outer perimeter of housing 14. The second position may be referred to as an "extended position." Thus, when movable member 12 is in the second position, second connector 20 is exposed and may be introduced into a host connection interface of a host device. Furthermore, when movable member 12 is in the second position, the overall height memory card 10 increases, which may facilitate easier handling of memory card 10, especially for users with limited dexterity.

In embodiments in which second connector 20 conforms to the USB standard, memory card 10 may be directly introduced into a USB port of a host computer or another host device. In this way, the host computer may access memory 16 without an adaptor or reader. Because first connector 18 and second connector 20 are mechanically connected and first connector 18 moves with second connector 20, at least a portion of first connector 18 is disposed within housing 14 when movable member 12 is in the second position. When at least a portion of first connector 18 is covered by housing 14 when during use of second connector 20, first connector 18 may be protected from damage, electrostatics, or debris without the need for a cap or another protective covering other than housing 14 that covers first connector 18. Eliminating the need for a separate protective covering simplifies memory card 10.

When movable member 12 is in its second position, the dimension of memory card 10 may or may not substantially conform to a memory card standard. In the embodiment shown in FIG. 1B, when movable member 12 is in its second position, the width W and thickness T of memory card 10 remain the same, but the height H substantially increases (as indicated by height H'), and accordingly, memory card 10 does not conform to a memory card standard. However, because movable member 12 is in its second position in order to connect memory card 10 to a host rather than a device, the dimensions of memory card 10 do not necessarily need to conform to a memory card standard.

Movable member 12 is movable between the first position (FIG. 1A) and the second position (FIG. 1B) via any suitable technique. For example, in one embodiment, movable member 12 may be slidably mounted (e.g., within channels) within housing 14 such that movable member 12 may slide between the first and second positions. A user may manipulate an external handling member (not shown in FIG. 1A or 1B) that is located on the exterior of housing 14 and mechanically coupled to movable member 12 in order to move movable member 12. Alternatively, the user may grasp second connector 20 in order to move movable member 12 between the first and second positions. For example, as described in further detail below, second connector 20 may include a groove sized to engage with a user's fingernail, thereby providing a feature that facilitates engagement between the user's hand and second connector 20. In addition, as discussed below, memory card 10 may also include a locking mechanism to retain movable member 12 in the first and second positions. A locking mechanism may help movable member 12 from inadvertently moving during use of first and second connectors 18, 20.

FIGS. 2-5 are block diagrams illustrating architectures of memory cards, and particularly, movable members, according to various embodiments. FIGS. 2-5 illustrate different components that may be disposed on a movable member. However, in some embodiments, some of the components illustrated in FIGS. 2-5 may be disposed on housing 14 or on a different movable or stationary member within housing 14.

Figure 2:
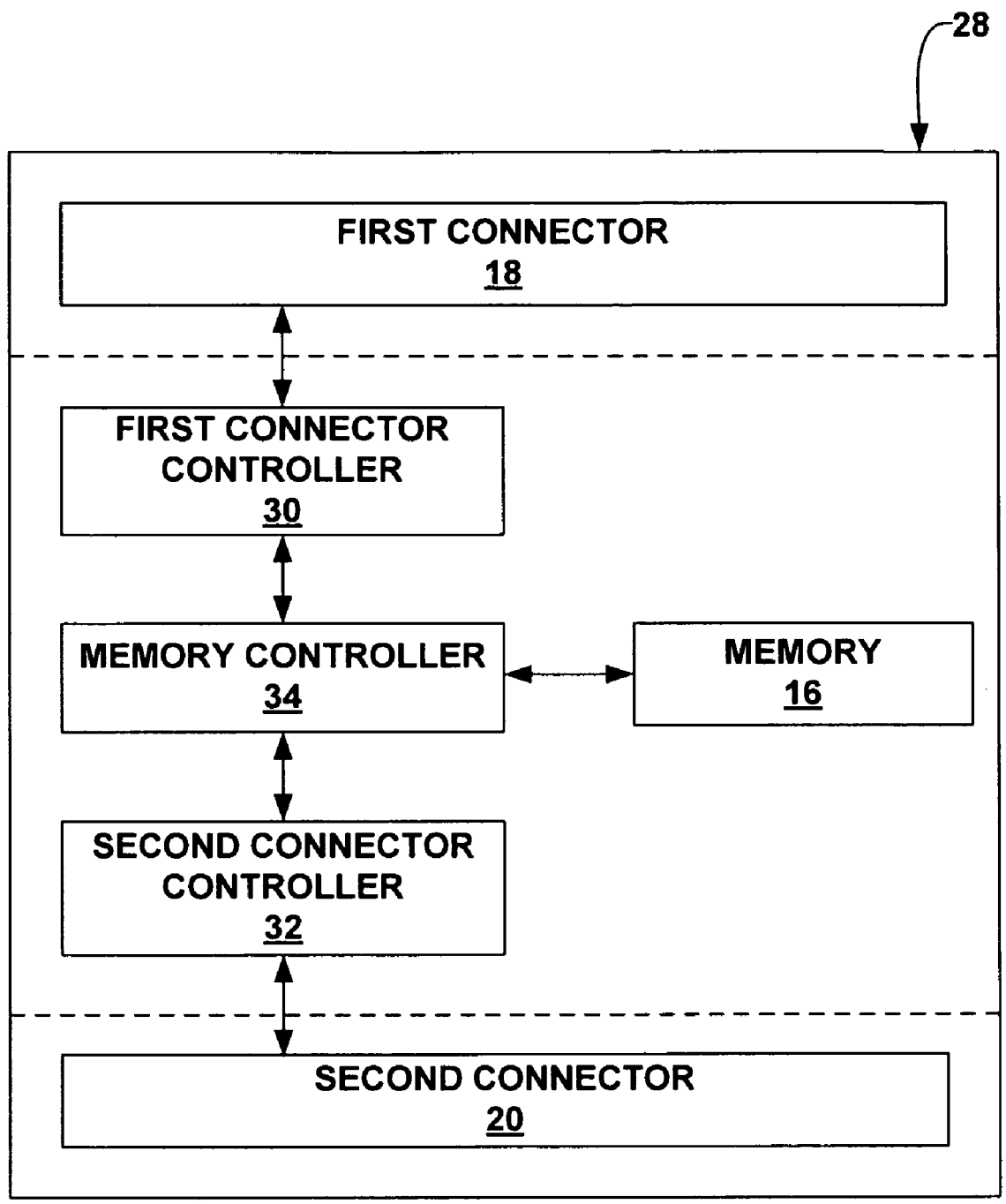
FIGS. 2-5 each illustrate a block diagram of an architecture of a movable member in accordance with different embodiments.

FIG. 2 is a block diagram illustrating one embodiment of a movable member 28, which includes memory 16, first connector 18, second connector 20, first connector controller 30, second connector controller 32, and memory controller 34. First connector 18 may be electrically coupled to memory 16 via first connector controller 30 and memory controller 34. Second connector 20 may be electrically coupled to memory 16 via second connector controller 32 and memory controller 34.

In one embodiment, memory controller 34 may accept firmware updates from second connector controller 32 via second connector 20, which may be, for example, a shieldless USB tab, allowing for easy upgrades of the memory card into which movable member is incorporated. Memory 16 may include flash ROM partitioned to store such firmware in a first section and use the remaining memory for standard storage capabilities. Thus, firmware updates may be stored in a first partitioned section of memory 16 and a data storage area may be defined in a second section of memory 16. Moreover, in some embodiments, memory controller 34 may repartition memory 16 at the time a firmware update is received. This may ensure adequate storage space if the firmware update is larger than the original firmware and will improve storage capabilities of the memory card if the firmware update is smaller than the original firmware.

In embodiments in which first connector 18 is a device connector and second connector 20 is a host connector, power is applied to movable member 28 when first connector 18 is connected via a device connection standard to a device or when second connector 20 is connected via a host connection standard to a host computer. The application of power allows the device or host computer to determine which electrical contact elements are active. Accordingly, the device or host computer can determine which of first connector 18 and second connector 20 is being used based on which electrical contact elements are active, and enable the respective connector controller 30 or 32.

First connector controller 30 or second connector controller 32 is enabled to facilitate access to memory 16, depending on which of first connector controller 30 and second connector controller 32 is being used. Communication between the device or host computer and memory controller 34 may then be sent through the powered connector 18 or 20 and the enabled controller 30 or 32. The device or host computer may read or modify data that is stored in memory 16 as well as store new data or erase existing data. Memory controller 34 manipulates the data stored in memory 16 according to operations specified by the device or host computer.

Figure 3:
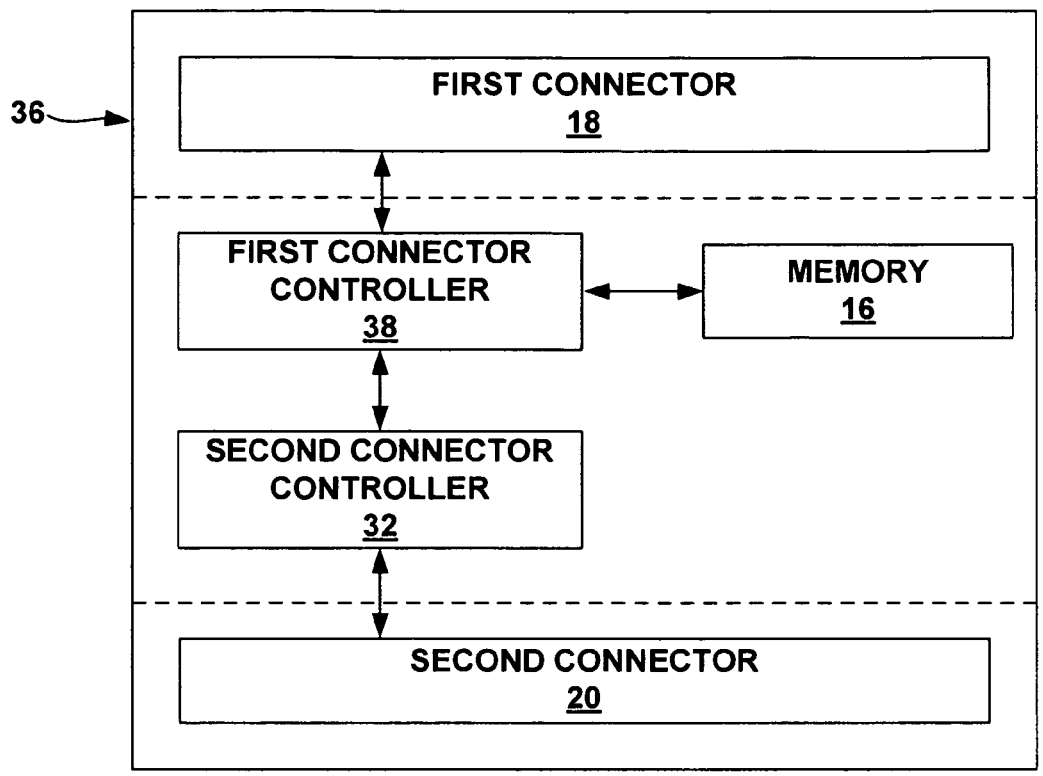

FIG. 3 is a block diagram illustrating another embodiment of a movable member 36 that may be incorporated into memory card 10. Movable member 36 includes memory 16, first connector 18, second connector 20, a first controller 38, and second connector controller 32. As in FIGS. 1A-2, memory 16 may comprise flash memory such as flash ROM, electrically-erasable-programmable-read-only-memory (EEPROM), non-volatile random-access-memory (NVRAM), and other nonvolatile or volatile memory types, such as synchronous dynamic random-access-memory (SDRAM), or the like.

The architecture of movable member 36 differs from that of movable member 28 shown in FIG. 2. While the architecture of movable member 28 utilizes three separate controllers, i.e., one for first connector 18, one for second connector 20, and one for memory 16, the embodiment of movable member 36 shown in FIG. 3 integrates the memory controller 34 with first connector controller 30 as a common first controller 38. An integrated first controller 38 may consume less space and power than separate controllers. Moreover, controllers that integrate memory and device connector controllers are commercially available and commonly used in conventional memory cards that do not include host connectors.

First controller 38 controls memory 16 and output via first connector 18. Second connector controller 32 controls output via second connector 20. First connector 18 may be electrically coupled directly to first controller 38 and then to memory 16, while second connector 20 may be electrically coupled to memory 16 via second controller 32.

In one embodiment, movable member 36 includes first controller 38 conforming to a flash memory controller, memory 16 conforming to a flash memory, and second controller 32 conforming to a USB controller. These components may be readily available due to their wide usage in traditional removable memory cards and adapters or readers. Flash memory controllers are manufactured by SanDisk Corporation of Milpitas, Calif. and Lexar Media Incorporated of Fremont, Calif., among others. Many companies, including Intel Corporation of Santa Clara, Calif., Samsung Electronics Company, Limited of Suwon-si, South Korea, and Kabushiki Kaisha Toshiba of Kawasaki, Japan, produce flash memory. USB controllers are typically found in flash memory card adaptors or readers and other devices utilizing USB connectivity. Such controllers are available from Cypress Semiconductor Corporation of San Jose, Calif., Philips Semiconductor, Incorporated of Tarrytown, N.Y., and many other semiconductor companies. In this embodiment, substantially all the elements included in movable member 36 are already being produced for other purposes and may be purchased directly from the manufacturer.

Another embodiment of movable member 36 includes additional connectors (not shown). The connectors may each conform to either a device connection standard or a host connection standard. Extra connectors allow the memory card into which movable member 36 is incorporated to couple to several device contacts and several host computer ports. In any case, additional connectors, each conforming to a different standard, add versatility to the memory card and movable member 36 and may eliminate the need for individual memory cards, external storage devices, and adaptors or readers.

Figure 4:
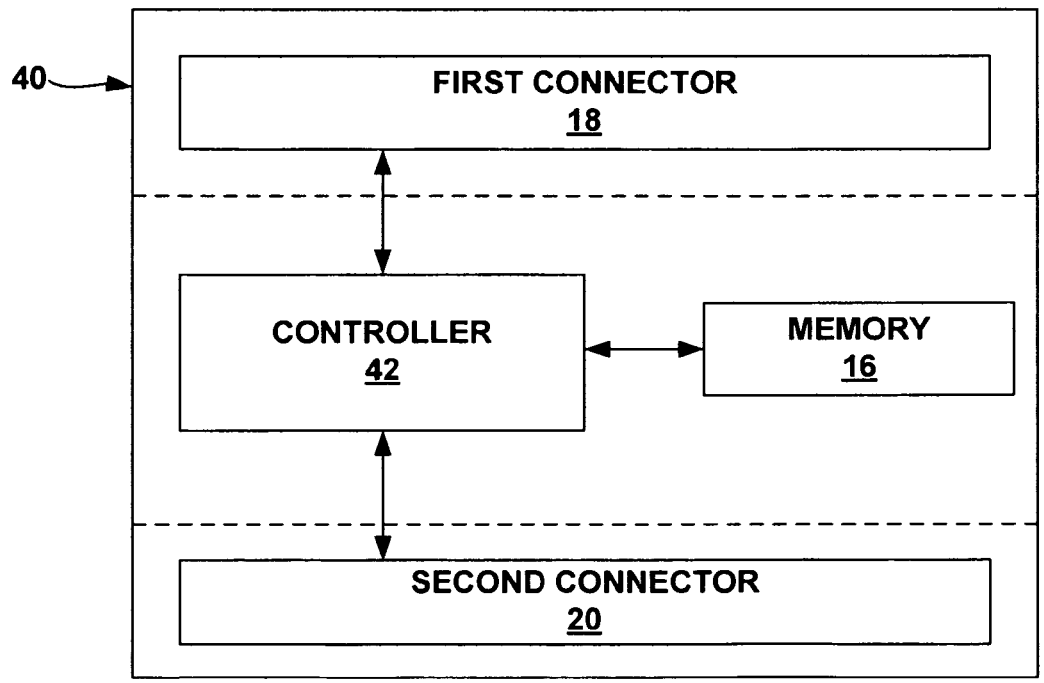

FIG. 4 is a block diagram illustrating another embodiment of movable member 40 that may be incorporated into a memory card, such as memory card 10 of FIGS. 1A-1B. As shown, movable member 40 includes memory 16, a first connector 18, second connector 20, and controller 42. As in the previous embodiments, first connector 18 may substantially conform to a device connection standard and second connector 20 may substantially conform to a host connection standard. Controller 42 comprises a memory controller integrated with a first (e.g., device) connector controller and a second (e.g., USB) controller. Whereas the architecture shown in FIG. 2 utilizes a separate controller for each connector 18, 20 and memory 16, controller 42 shown in the embodiment of FIG. 4 integrates such functionality of three different controllers into a common unit. By integrating the functionality of each separate controller into controller 42, less space and power may be consumed on movable member 40.

Controller 42 controls memory 16 and output via both first connector 18 and second connector 20. First connector 18 may be electrically coupled directly to controller 42 and then to memory 16. Second connector 20 may also be electrically coupled to memory 16 via controller 42.

In one embodiment, controller 42 conforms to a flash memory controller with USB control and memory 16 conforms to flash memory. First connector 18 may couple to a device contact conforming to the Memory Stick standard. Second connector 20 may be configured to couple directly to a computing device's USB port allowing communication between the host computer and controller 42 without an adaptor or reader. The flash memory controller with USB control may be developed as an application specific integrated circuit (ASIC) integrating the functionality of a conventional flash memory controller and a USB controller.

Figure 5:
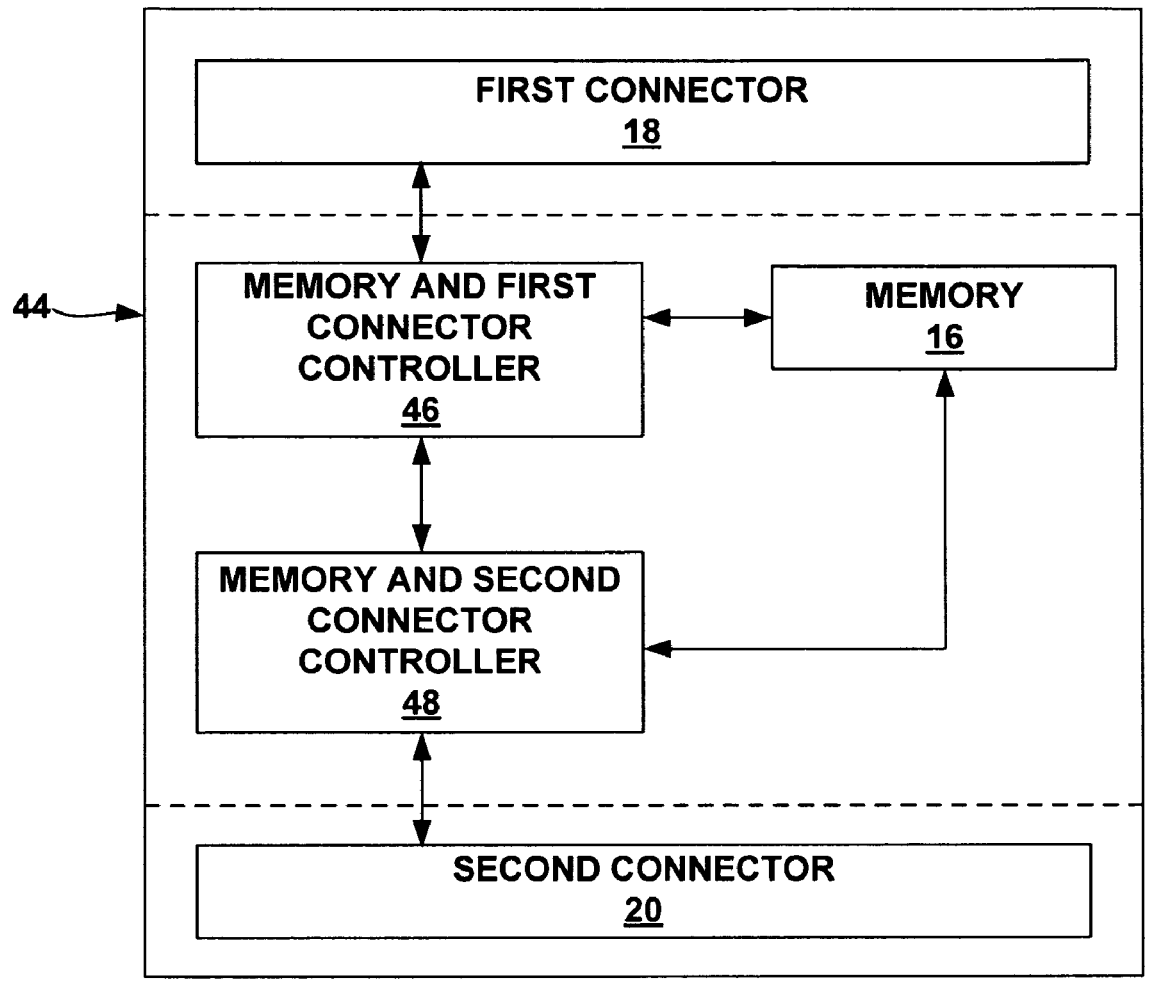

FIG. 5 is a block diagram illustrating another embodiment of movable member 44 according the invention. As shown, movable member 44 includes memory 16, first connector 18, second connector 20, memory and first connector controller 46, and memory and second connector controller 48. Memory 16, first connector 18, and second connector 20 may operate substantially similar to memory 16, first connector 18, and second connector 20, respectively, from FIGS. 2-4.

Whereas the architecture shown in FIG. 2 utilizes three separate controllers, i.e., one for first connector 18, one for second connector 20, and one for memory 16, the embodiment of movable member 44 shown in FIG. 5 integrates memory control into controller 46 for first connector 18 and controller 48 for second connector 20. Such integrated controllers 46, 48 may consume less space and power than three separate controllers. Moreover, controllers that integrate the memory and connector controls are commercially available for use in conventional memory cards that include a memory and a single device connector. Controllers that integrate the memory and host connector controls are also commercially available for use in conventional portable memory drives that include a memory and a single host connector.

Memory and first connector controller 46 controls memory 16 and output via first connector 18. Memory and second connector controller 48 also controls memory 16 and output via second connector 20. First connector 18 may be electrically coupled to memory 16 via memory and first connector controller 46. Similarly, second connector 20 may be electrically coupled to memory 16 via memory and second connector controller 48.

In one embodiment of the invention, movable member 44 includes first connector 18 conforming to a Memory Stick standard and second connector 20 conforming to an USB standard. Movable member 44 may also include memory and first connector controller 46 conforming to a flash memory card controller, memory 16 conforming to a flash memory, and memory and second connector controller 48 conforming to a flash memory drive controller. These components may be readily available due to their wide usage in traditional removable memory cards and traditional removable memory drives.

Figure 6A:
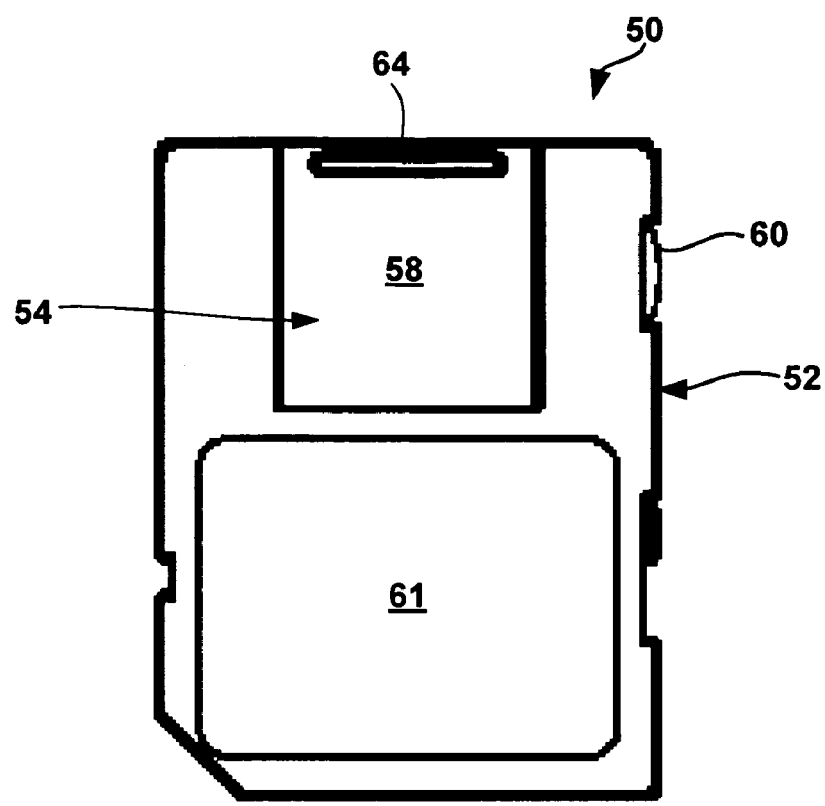
FIGS. 6A and 6B are schematic plan views of different sides of a memory card including a movable member carrying at least two connectors conforming to different connections standards.
Figure 6B:
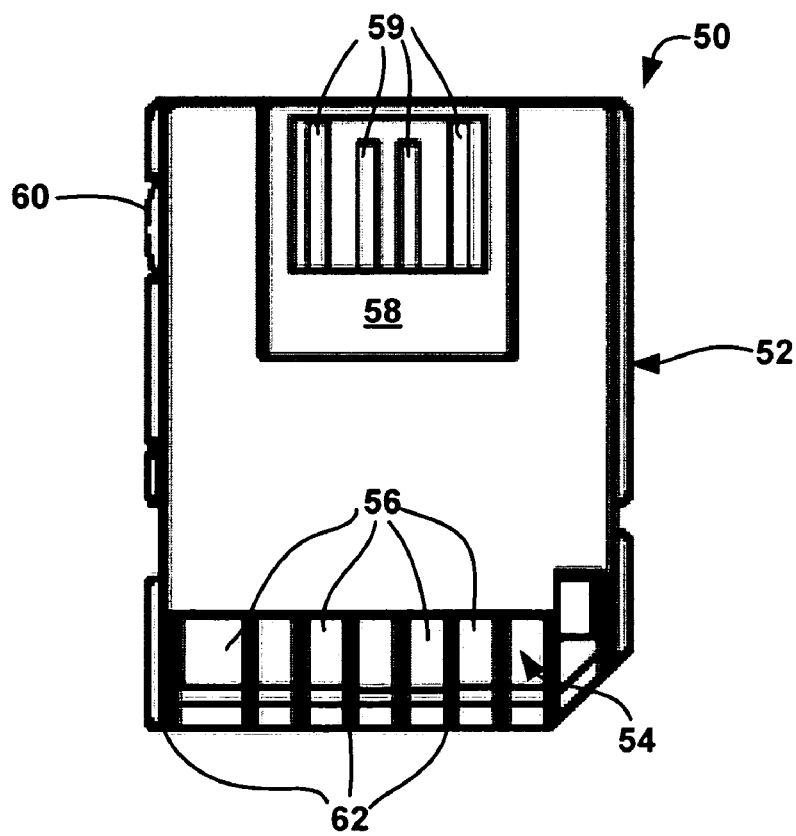
Figure 7A:
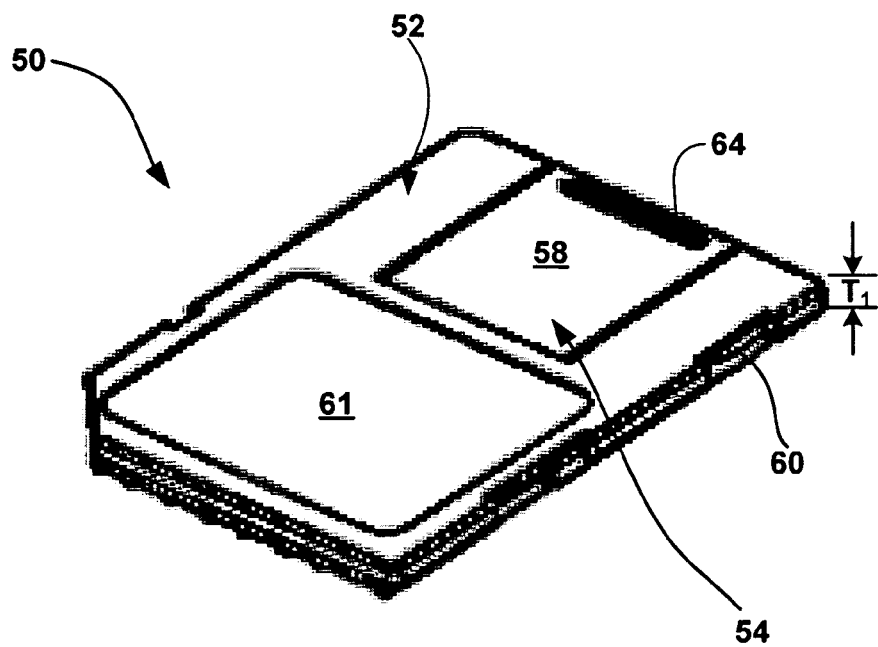
FIGS. 7A and 7B are schematic perspective views of the memory card of FIGS. 6A and 6B.
Figure 7B:
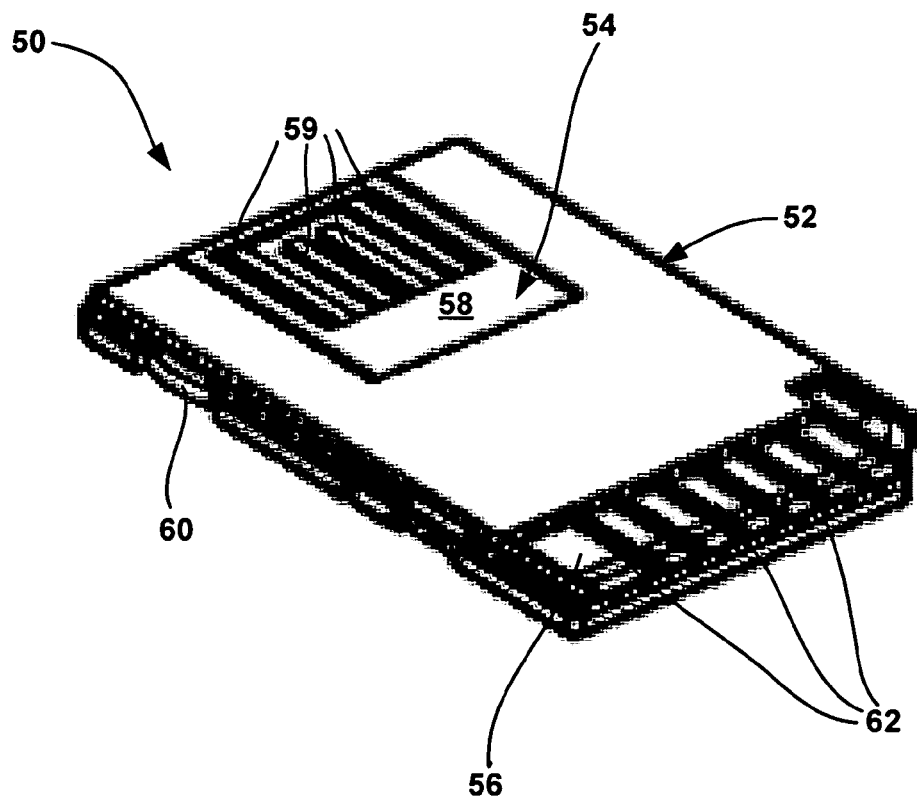

FIGS. 6A and 6B are plan views of opposite sides of removable memory card 50 in accordance with one embodiment of the invention. FIGS. 7A and 7B are perspective views illustrating opposite sides of memory card 50. In particular, FIGS. 6A and 7A illustrate the same side of memory card 50, while FIGS. 6B and 7B illustrate the same side of memory card 50. As shown in FIGS. 7A and 7B, memory card 50 has a thickness $T_1$.

As shown in FIGS. 6A-7B, memory card 50 includes housing 52, movable member 54, which carries device connector 56, host connector 58, which includes a plurality of electrical contacts 59, and release member 60, which is a part of a locking mechanism to lock movable member 54 in a first or second position. The overall dimensions of memory card 50 when movable member 54 is in a first, retracted position as shown in FIGS. 6A-7B substantially conforms to dimensions of a memory card standard (i.e., a memory card form factor). In particular, when movable member 54 is in a first, retracted position as shown in FIGS. 6A-7B, memory card 50 may comply with length width and depth dimensions of a memory card standard. Furthermore, housing 52 is asymmetrical, which helps guide insertion of memory card 50 into a device or host computer. In particular, the asymmetrical shape of housing 52 helps prevent memory card 50 from being inserted upside down or backwards. In other embodiments, housing 52 may be symmetrical or have another shape, which may be dictated by a memory card standard.

Movable member 54 may be a circuit board or the like that supports device connector 56 and host connector 58. In addition, movable member 54 may include electrical connections for electrically connecting a memory to both device connector 56 and host connector 58, and any controllers. Device connector 56 and host connector 58 are located on opposite ends of movable member 54. Although not shown in FIGS. 6A-7B, memory card 50 may include a memory, a device connector controller, a memory controller, and a host connector controller. All three controllers may be separate, as seen in the embodiment of FIG. 2, or the memory controller may be integrated with either one or both connector controllers as seen in the embodiments of FIG. 3, 4 or 5. An integrated controller may be desirable if a limited amount of space or power is available on memory card 50.

Housing 52 and movable member 54 may be similar to housing 14 and movable member 12, respectively, of FIGS. 1A and 1B. Device connector 56 and host connector 58 may be similar to first connector 18 and second connector 20, respectively, of FIGS. 1A-1B. In the embodiment shown in FIGS. 6A-7B, device connector 56 is configured to facilitate electrical coupling of memory card 50 to a device contact conforming to the same standard, allowing data to be stored in or read from the memory. In order to read the stored data or write to the memory with a host computer, memory card 50 may be removed from the device contact and host connector 58, located on the opposite side of movable member 54 from device connector 56, may then be coupled to a port on the host computer that conforms to the same standard. The memory controller may then perform read and write operations on the memory as specified by the host computer.

Housing 52 defines a plurality of ridges 62 that protrude away from device connector 56 when movable member 54 is in the first position. In the views shown in FIGS. 6A-7B, movable member 54 is in a first position, in which device connector 56 is exposed through ridges 62. Ridges 62 and device connector 56 define the mechanical and electrical contacts that are configured to connect to a device contact. The mechanical and electrical contacts are configured to substantially conform to a device connection standard, such as an SD standard. Ridges 62 may help minimize inadvertent contact with device connector 56, such as by a user's fingers.

As described in further detail below, memory card 50 includes a latching mechanism in order to help secure movable member 54 in either the first position (shown in FIGS. 6A-7B) or the second position (shown in FIGS. 9-10B). The latching mechanism comprises a biased arm coupled to housing 52, where the biased arm is biased toward movable member 54 and is configured to engage and interlock with a notch defined by movable member 54 to lock movable member 54 in either the first or second positions. Release member 60 is mechanically coupled to the biased arm and a user may pull release member 60 (i.e., move release member 60 outward and away from movable member 54) in order to release the biased arm from the notch and "unlock" movable member 54. It may be desirable to unlock movable member 54 to move movable member 54 between the first and second positions.

Label 61 may be placed on housing 52. Label 61 may identify the manufacturer of memory card 50, the memory card standard, the size of the memory or other information.

FIGS. 6A and 7A also illustrate groove 64 defined within host connector 58. Groove 64 may be sized and shaped to receive a gripping device (e.g., a fingernail) and provides a feature for a user to hold movable member 54, and in particular, host connector 58. For example, a user may insert a gripping device into groove 64 in order to slide movable member 54 outward, away from housing 52 and move movable member 54 into a second position. In the first position, host connector 58 does not extend past the outer perimeter of housing 52, and accordingly, may be difficult to grasp without groove 64 or another engagement feature.

Figure 8A:
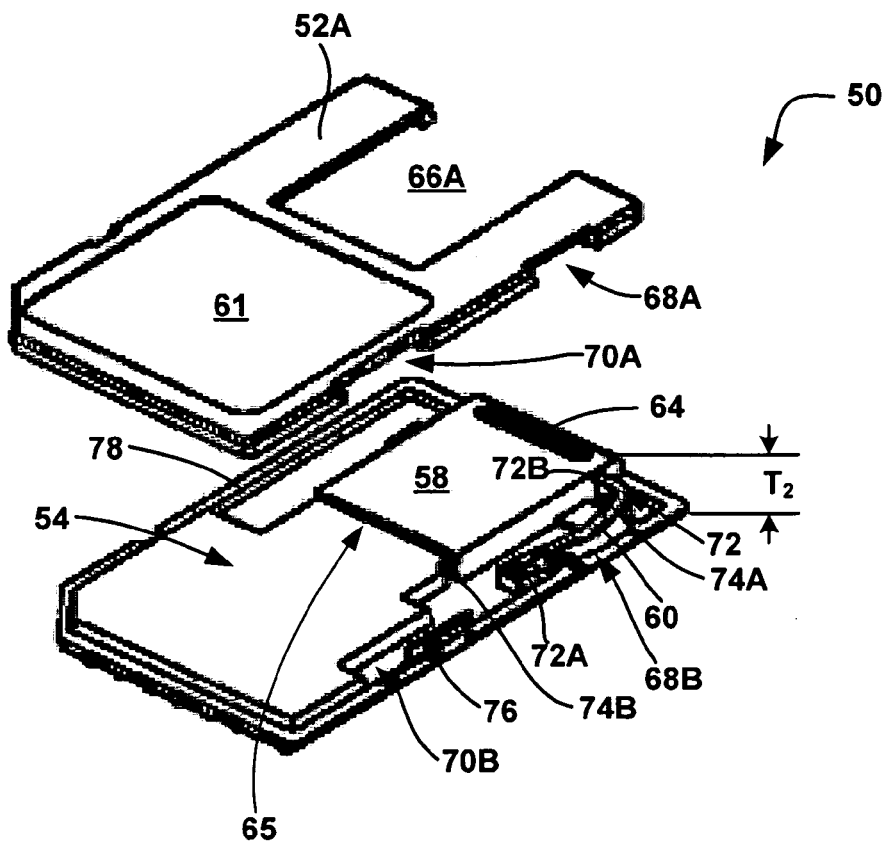
FIGS. 8A and 8B are schematic exploded perspective views of the memory card of FIGS. 6A-7B.
Figure 8B:
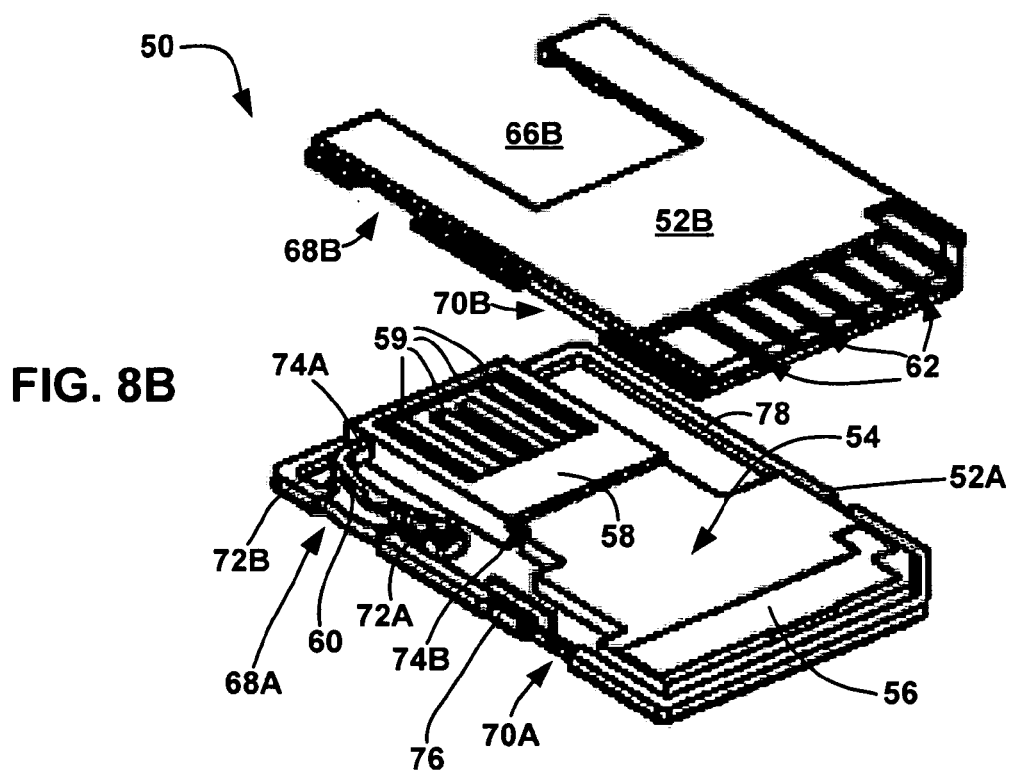

FIG. 8A is an exploded perspective view of memory card 50 from the perspective shown in FIGS. 6A and 7A, while FIG. 8B is an exploded perspective view of memory card 50 from the perspective shown in FIGS. 6B and 7B. As FIGS. 8A and 8B illustrate, in one embodiment, housing 52 is comprised of first housing portion 52A and second housing portion 52B. First housing portion 52A defines opening 66A and second housing portion 52B defines a corresponding opening 66B. Openings 66A and 66B are configured to accommodate a thickness of host connector 58. Host connector 58, which may be a shieldless USB tab, defines a thickness $T_2$ that is substantially equal to a thickness $T_1$ (shown in FIGS. 7A and 7B) of housing 52. As FIGS. 8A and 8B illustrate, there is a thickness change between host connector 58 and a remainder of movable member 54 in region 65. Thus, in order to substantially comply with a memory card form factor, a part of each housing portion 52A, 52B is removed to accommodate the thickness of host connector 58. If the housing portions 52A, 52B did not define openings 66A-B to receive host connector 58, the total thickness of memory card 50 may exceed the total thickness of accepted memory card form factors and memory card 50 may not fit within many devices. In other embodiments, host connector 58 may be sized to fit within housing 52 without opening 66 in housing portions 52A, 52B. In yet other embodiments, first and second housing portions 52A, 52B, respectively, may be molded to accommodate host connector 58 and cover at least a portion of host connector 58 when movable member 54 is in the first, retracted position.

Opening 66 also provides access to host connector 58, which may be useful in applications in which a user grasps host connector 58 (e.g., groove 64 of host connector 58) to move movable member 54 between the first and second positions, and possibly positions in between the first and second positions.

First housing portion 52A also defines aperture 68A that is configured to receive release member 60 and biased arm 72. Second housing portion 52B defines corresponding aperture 68B. Release member 60 and biased arm 72 are a part of a locking mechanism for securing movable member 54 in the first or second positions. In the embodiment shown in FIGS. 8A and 8B, release member 60 and biased arm 72 are integrally formed. However, in other embodiments, release member 60 and biased arm 72 may be separate parts that are coupled together. Biased arm 72 and release member 60 may each be formed of any suitable material, including, but not limited to a plastic or a metal. Biased arm 72 includes first portion 72A that is connected to second housing portion 52B and second portion 72B that is biased toward movable member 54. Release member 60 is mechanically coupled to and positioned in operable relation to second portion 72B of biased arm 72 such that when release member 60 is moved away from movable member 54, second portion 72B of biased arm 72 is also moved away from movable member 54.

Movable member 54 defines two slots 74A and 74B that are configured to receive second portion 72B of biased arm 72. In particular, second portion 72B of biased arm 72 is received in slot 74A to secure movable member 54 is in the first position, as shown in FIGS. 8A and 8B, and biased arm 72 is received in slot 74B to secure movable member 54 in the second position, as shown in FIGS. 9-10B. In order to move movable member 54 from the first position to the second position, release member 60 may be moved away from movable member 54 until second portion 72B of biased arm 72 is no longer received in slot 74A. A user may simultaneously or subsequently move movable member 54 (e.g., by grasping host connector 58) toward the second position until second portion 72B of biased arm 72 is received in slot 74B defined by movable member 54. In one embodiment, biased arm 72 "snaps" into place in slot 74B, thus providing confirmation to the user that movable member 54 is secured in the second position. A similar technique may be used to move movable member 54 from the second position to the first position.

In other embodiments, other types of locking mechanisms may be used in addition to or instead of the latching mechanism shown in FIGS. 6A-7B. For example, in one embodiment, another technique may be used to move biased arm 72 into engagement and out of engagement with slots 74A and 74B. As another example, in another embodiment, biased arm 72 may be disposed on movable member 54, and housing 52 may define slots to receive biased arm 72 (which is biased toward housing 52) and engage with biased arm 72 to secure movable member 54 in the first or second position. Alternatively, an arm that is not biased may engage with slots defined by movable member 54 or housing 52, and a user may mechanically move the arm into engagement with the slots to secure movable member 54 in a first or second position. In yet another alternative, release member 60 and biased arm 72 may be used to move movable member 54 between the first and second positions. For example, release member 60 and arm 72 may be mechanically coupled to movable member 54 and a user may slide release member 60 within openings 68A-B to move movable member 54 between the first and second positions.

First and second housing portions 52A and 52B also define apertures 70A, 70B, respectively, which are configured to receive write lock member 76. Write lock member 76 may be moved between two positions. When write lock member 76 is in a first position within apertures 70A, 70B, a device or host computer into which memory card 50 is inserted senses the absence of write lock member 76 from a second position within apertures 70A, 70B, and blocks access to memory 16 to prevent overwriting of the contents of memory 16. When write lock member 76 is in a second position within apertures 70A, 70B, the device or horst computer senses the presence of write lock member 76 in the second position and memory 16 is accessible and information may be written to memory card 16.

As FIGS. 8A and 8B illustrate, movable member 54 is mounted within channels 78, facilitating relatively easy movement of movable member 54 relative to housing 52. Channels 78 may be integrally formed with housing 52 or may be separate from housing 52 and attached thereto. Channels 78 may have a thickness (measured in the same direction as thickness $T_1$ of memory card 50) that is greater than or equal to a thickness of movable member 54.

Figure 9:
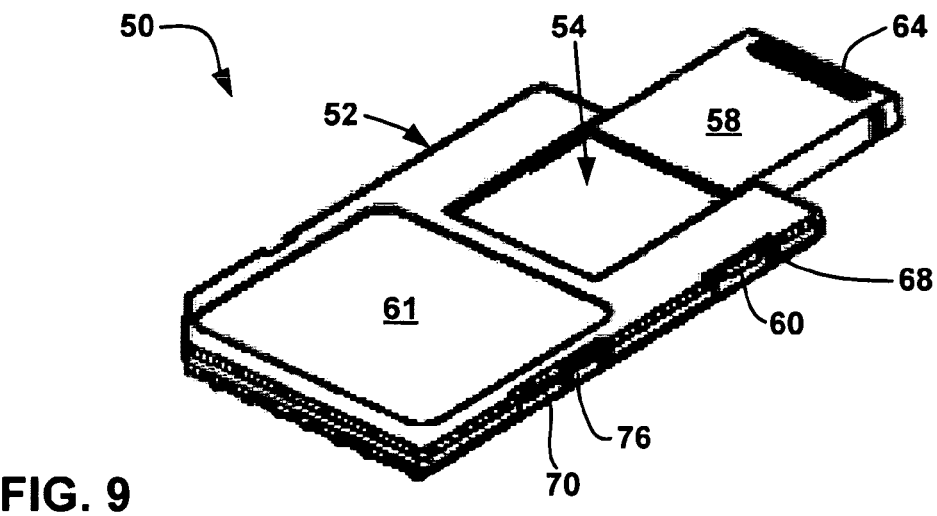
FIG. 9 is a schematic perspective view of the memory card of FIGS. 6A-8B, and illustrates a host connector extending from the housing of the memory card.
Figure 10A:
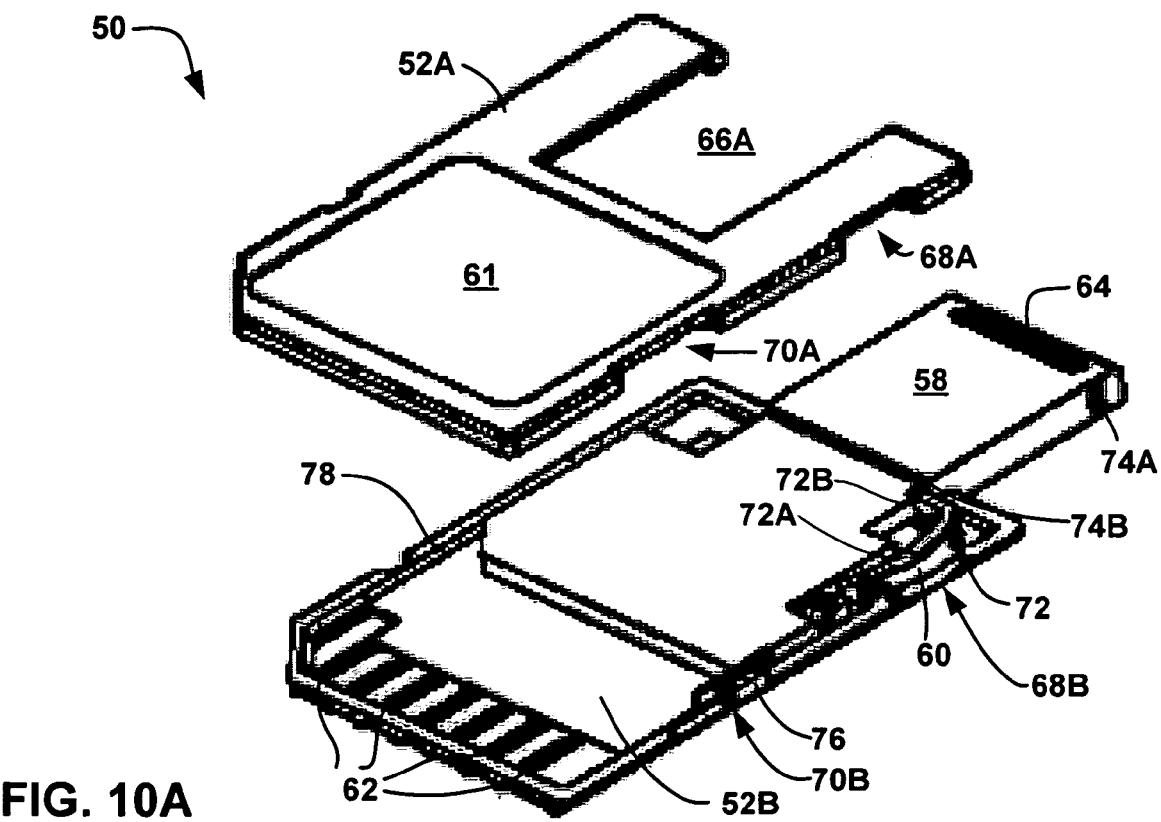
FIGS. 10A and 10B are schematic exploded perspective views of the memory card of FIG. 9.
Figure 10B:
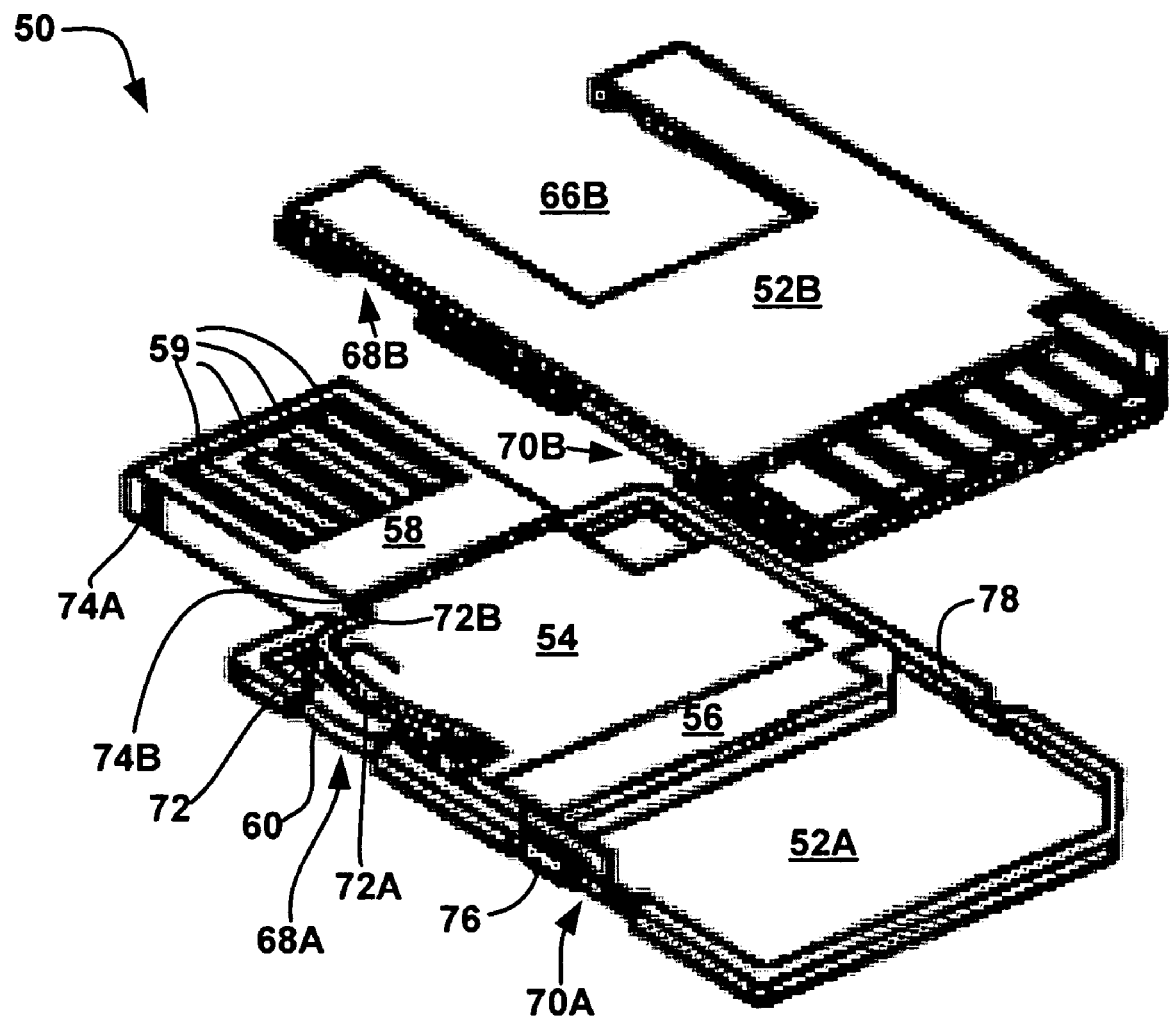

FIG. 9 is a perspective view of memory card 50 and illustrates movable member 54 is in the second position relative to housing 52. Similarly, FIGS. 10A and 10B are exploded perspective views of memory card 50 and illustrates movable member 54 in the second position. FIGS. 10A and 10B illustrate opposite sides of memory card 50.

In the second position, host connector 58 extends past the outer perimeter of housing 52, which permits easier connection of host connector 58 to a host device. In addition, the overall size of memory card 50 is increased when host connector 58 extends from housing 52, which may allow for easier handling of memory card 50. For example, if host connector 58 is a shieldless USB tab, host connector 58 may more easily be introduced into a USB port of a computing device when host connector 58 protrudes from housing 52, as shown in FIGS. 9-10B. When movable member 54 is in the first position, housing 52 cover device connector 56 because movable device connector 56 is carried on an opposite end of movable member 54. That is, as movable member 54 is slid along channels 78 to the second position such that host connector 58 extends housing 52, device connector 56 is slid away from ridges 62 and into a portion of housing 52 that covers at least a portion of device connector 56. In the embodiment shown in FIGS. 9-10B, the entire device connector 56 is covered when movable member 54 is in the second position. In this way, damage to device connector 56 from electrostatics or debris is minimized during use of host connector 58 without the need for a separate cap or other protective covering to cover device connector 56.

As described above and shown in FIGS. 10A and 10B, in the second position, biased arm 72 is received in slot 74B, which secures movable member 54 in the second position.

Figure 11:
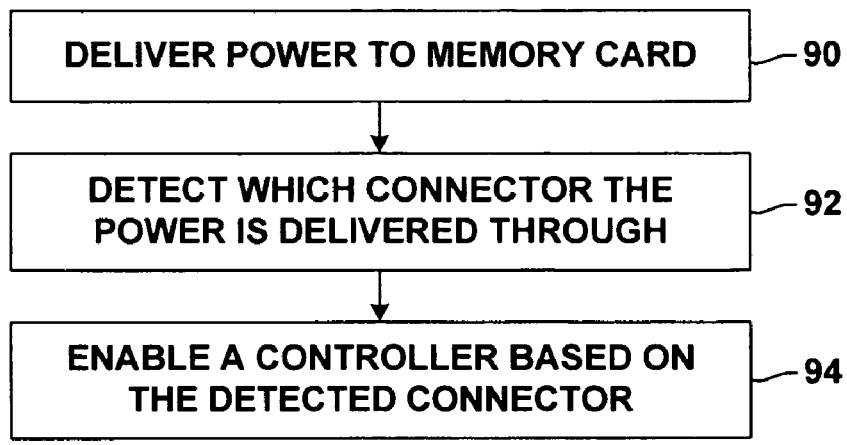
FIG. 11 is a flow diagram illustrating a process of enabling a controller of a memory card in accordance with one embodiment.

FIG. 11 is a flow diagram illustrating a process of enabling a controller of memory card 50 in accordance with one embodiment. While the process is described with respect to memory card 50, in other embodiments, the process may be used with any memory card including a movable member carrying at least two connectors.

Power is delivered to memory card 50 (90) when it is coupled to a first device (e.g., a digital device) or a second device (e.g., a host computer). In particular, power can be delivered from the first device or the second device to memory card 50. The first device or second device may then detect which connector 56 or 58 is being used to deliver the power to memory card 50 (92) by determining which connector 56 or 58 has active electrical contact elements. A connector controller corresponding to the connector 56 or 58 with the active contact elements may then be enabled (94). When enabled, the first device or the second device may access to memory 16 via the respective connector controller and a memory controller. The memory controller may allow the first device or second device to read the data that is stored in the memory, which may be carried by movable member 54. The devices may also be able to write new data to memory 16. In some embodiments the memory controller may allow existing data stored in memory 16 to be modified or deleted.

Figure 12:
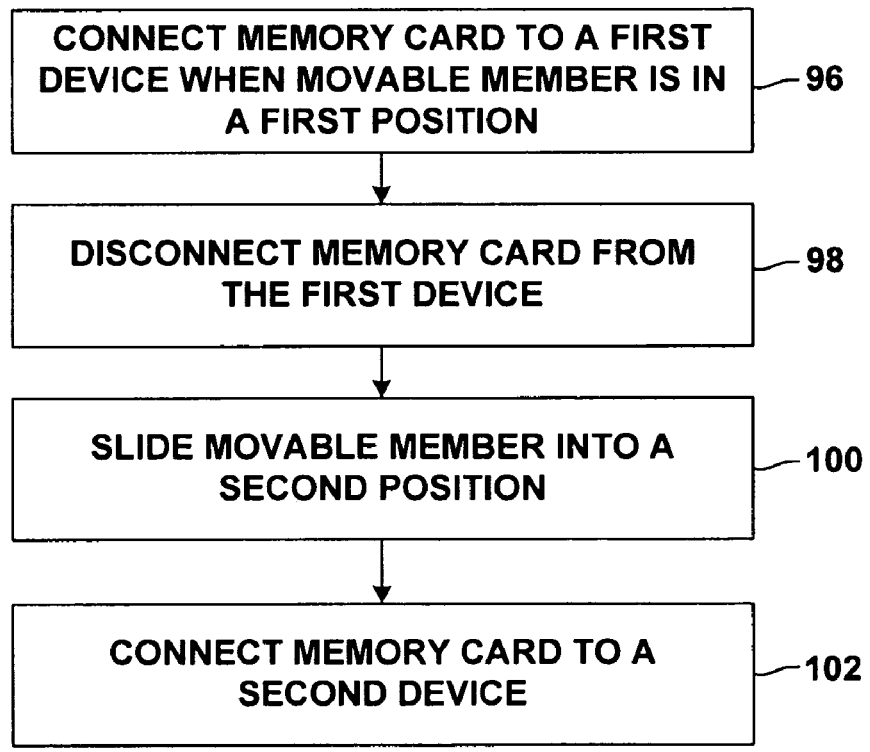
FIG. 12 is a flow diagram illustrating a process of using a memory card in accordance with one embodiment.

FIG. 12 is another flow diagram illustrating a process of using memory card 50 in accordance one embodiment of the invention. When movable member 54 is in the first position, memory card 50 may be connected to a first device (96), such as a digital camera, personal digital assistant, cellular phone, photo printer, digital television, video game console, and the like. The memory may be accessed by the first device via first connector 56. If the user wishes to connect memory card 50 to a host computer, the user may disconnect memory card 50 from the first device (98), and slide movable member 54 along channels 78 to the second position to expose host connector 58 (100). For example, the user may disengage second portion 72B of biased arm 72 from slot 74A and introduce a tool or a fingernail into groove 64 in host connector 58 to grasp host connector 58 and pull host connector 58 away from housing 52. The user may confirm that movable member 54 is substantially secured in the second position by confirming that biased arm 72 is engaged with slot 74B. For example, the user may push host connector 58 toward housing 52 to confirm that movable member 54 is substantially secured in the second position. Once movable member 54 is in the second position, host connector 58 may be connected to a second device (102), such as a computing device, to connect memory card 50 to the second device.

The flow diagram shown in FIG. 12 may also be used to connect memory card 50 to a host computer (96) and subsequently to a device. For example, if the user wishes to connect memory card 50 to a device, the user may disconnect memory card 50 from the host device (98), and slide movable member 54 along channels 78 to the first, retracted position to expose device connector 56 (100). For example, the user may release biased arm 72 from slot 74B and push movable member 54 toward housing 52. The user may confirm that movable member 54 is substantially secured in the first position by confirming that biased arm 72 is engaged with slot 74A. For example, the user may pull host connector 58 away housing 52 to confirm that movable member 54 is substantially secured in the second position. Once movable member 54 is in the first position, host connector 58 may be connected to a device (102), such as a digital camera, to connect memory card 50 to the second device.

Various embodiments of the invention have been described. For example, memories cards including a device connector and host connector have been described that have dimensions substantially conforming to dimensions of a memory card standard. As mentioned, the dimensions may include a height that is one of approximately 31 mm and approximately 50 mm, a width that is one of approximately 20 mm and approximately 21.5 mm, and a thickness that is one of approximately 1.6 mm and approximately 2.8 mm.

Although several standards have been listed for exemplary memory card standards and exemplary host standards, other standards could be supported without departing from the scope of the following claims. For example, although various embodiments have been described in the context of the Memory Stick standard, various features described herein may also find use with other standards. For example, the memory card including one or more features described herein may alternatively conform to a Compact Flash standard, a MultiMedia Card standard, a Secure Digital standard, a Smart Media standard, an xD standard, a yet released standard, or the like.

The host connector of the memory card has been exemplified by a shieldless USB tab. As discussed above, it may be desirable to use a shieldless USB tab if the memory card standard has a thickness that is less than the thickness of a conventional USB tab. Alternatively, the host connector may comprise a personal computer memory card international association (PCMCIA) standard including a 16 bit standard PC Card standard and a 32 bit CardBus standard, a Universal Serial Bus (USB) standard, a Universal Serial Bus 2 (USB2) standard, an IEEE 1394 FireWire standard, a Small Computer System Standard (SCSI) standard, an Advance Technology Attachment (ATA) standard, a serial ATA standard, a Peripheral Component Interconnect (PCI) standard, a PCI Express standard, a conventional serial or parallel standard, or the like. The standards described herein refer to such standards as defined on the filing date of this patent application.

The invention claimed is:

1. A memory card comprising:
    a housing;
    a memory; and
    a movable member movably mounted to the housing, the movable member comprising:
        a first connector electrically coupled to the memory and substantially conforming to a first connection standard; and
        a second connector electrically coupled to the memory and substantially conforming to a second connection standard,
        the movable member being movable between a first position and a second position, wherein when the movable member is in the first position, the first and second connectors are at least partially exposed and the second connector does not extend past an outer perimeter of the housing, and wherein when the movable member is in the second position, the second connector is exposed, at least a portion of the second connector extends past the outer perimeter of the housing, and at least a portion of the first connector is substantially covered.

2. The memory card of claim 1, wherein the movable member comprises the memory.

3. The memory card of claim 1, wherein the housing defines a first opening configured to expose at least a first part of the first connector and define a first connection interface when the movable member is in the first position and a second connector opening configured to expose at least a second part of the second connector and define a second connection interface when the movable member is in the second position.

4. The memory card of claim 1, wherein the first connection standard comprises a device communication connector (DCC) standard and the second connection standard comprises a host computer connector (HCC) standard.

5. The memory card of claim 4, wherein: the DCC standards comprises a standard selected from a group consisting of: a Compact Flash standard, a Smart Media standard, a MultiMedia Card standard, a Secure Digital standard, a Memory Stick standard, and an xD standard, and the HCC standard comprises a standard selected from a group consisting of: a personal computer memory card international association (PCMCIA) standard, a PC Card standard, a CardBus standard, a Universal Serial Bus (USB) standard, a Universal Serial Bus 2 (USB2) standard, an IEEE 1394 FireWire standard, a Small Computer System Interface (SCSI) standard, an Advance Technology Attachment (ATA) standard, a serial ATA standard, a Peripheral Component Interconnect (PCI) standard, and a conventional serial or parallel standard.

6. The memory card of claim 1, wherein the first connector is disposed on an opposite side of the movable member from the second connector.

7. The memory card of claim 1, wherein the second connector defines a groove configured to receive a gripping device.

8. The memory card of claim 1, further comprising a controller that controls the memory and output via the first connector and the second connector, wherein the first and second connectors are electrically coupled to the memory through the controller.

9. The memory card of claim 1, further comprising a locking mechanism to substantially secure the movable member in a retracted position relative to the housing.

10. The memory card of claim 9, wherein the locking mechanism comprises:
    an arm coupled to the housing; and
    a slot defined by the movable member and configured to engage with the arm.

11. The memory card of claim 10, wherein the slot is a first slot and the movable member further defines a second slot configured to engage with the arm to secure the movable member in an extended position relative to the housing.

12. The memory card of claim 1, wherein the housing defines an opening, wherein when the movable member is in the first position, the second connector is at least partially exposed through the opening.

13. The memory card of claim 12, wherein the second connector comprises a first thickness that is substantially equal to a second thickness of the housing, the opening defined by the housing being configured to accommodate the first thickness of the second connector.

14. The memory card of claim 1, wherein the housing defines a plurality of slots that at least partially expose the first connector when the movable member is in the first position.

15. A system comprising:
    a first device including a first electrical contact for receiving a first connector that conforms to a first connection standard;
    a second device including a second electrical contact for receiving a second connector that conforms to a second connection standard; and
    a memory card including:
        a housing; and
        a movable member movably mounted within the housing, the movable member comprising:
            a memory;
            the first connector electrically coupled to the memory and conforming to the first connection standard; and
            the second connector electrically coupled to the memory and conforming to the second connection standard,
        wherein when the movable member is in a first position relative to the housing, the first and second connectors are at least partially exposed and the second connector does not extend past an outer perimeter of the housing and when the movable member is in a second position relative to the housing, the second connector is exposed, at least a portion of the second connector extends past the outer perimeter of the housing, and the first connector is at least partially retracted within the housing.

16. The system of claim 15, wherein the first connection standard comprises a device communication connector (DCC) standard selected from a group consisting of a Compact Flash standard, a Smart Media standard, a MultiMedia Card standard, a Secure Digital standard, a Memory Stick standard, and an xD standard, and the second connection standard comprises a host computer communication connector (HCC) standard selected from a group consisting of a personal computer memory card international association (PCMCIA) standard, a PC Card standard, a CardBus standard, a Universal Serial Bus USB) standard, a Universal Serial Bus 2 (USB2) standard, an IEEE 1394 FireWire standard, a Small Computer System Interface (SCSI) standard, an Advance Technology Attachment (ATA) standard, a serial ATA standard, a Peripheral Component Interconnect (PCI) standard, and a conventional serial or parallel standard.

17. A method comprising:
    moving a movable member of a memory card to an extended position to cover a first connector substantially conforming to a first connection standard and expose a second connector substantially conforming to a second connection standard, wherein when the movable member is in the extend past the position, at least a portion of the socond connector extends past an outer perimeter of the housing, the memory card further comprising:
        a housing, the movable member being movably mounted to the honsing, the movable member being movable between a retracted position and the extended position, wherein when the movable member is in the retracted position, the first and second connectors are at least partially exposed and the second connector does not extend past the outer perimeter of the housing; and
        a memory electrically coupled the first connector and the second connector; and
    electrically connecting the memory of the memory card to a device via the second connector.

18. The method of claim 17, wherein the first connection standard comprises a device communication connector (DCC) standard and the second connection standard comprises a host computer connector (HCC) standard.

19. The method of claim 17, wherein the device is a first device, and the method further comprises:
    moving the movable member of the memory card to the retracted position, wherein in the retracted position, the first connector is exposed and the memory card substantially conforms to a memory card form factor standard; and
    electrically connecting the memory of the memory card to a second device via the second connector.

20. The method of claim 17, further comprising securing the movable member in the extended position.

21. The method of claim 20, wherein securing the movable member in the extended position comprises drawing an arm into engagement with a slot.

22. A memory card comprising:
    a housing;
    a memory; and
    a movable member movably mounted to the housing, the movable member comprising:
        a first connector electrically coupled to the memory and substantially conforming to a first connection standard; and
        a second connector electrically coupled to the memory and substantially conforming to a second connection standard,
        the movable member being movable between a first position and a second position, wherein when the movable member is in the first position, the first connector is least partially exposed and does not extend past an outer perimeter of the housing and the second connector does not extend past the outer perimeter of the housing.

* * * * *